(12) United States Patent
Park

(10) Patent No.: US 9,798,354 B2
(45) Date of Patent: Oct. 24, 2017

(54) DISPLAY APPARATUS

(71) Applicant: Samsung Display Co., Ltd., Yongin (KR)

(72) Inventor: Sunghwan Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 186 days.

(21) Appl. No.: 14/562,812

(22) Filed: Dec. 8, 2014

(65) Prior Publication Data

US 2016/0004275 A1  Jan. 7, 2016

(30) Foreign Application Priority Data

Jul. 4, 2014 (KR) .................. 10-2014-0083895

(51) Int. Cl.
*H05K 1/00* (2006.01)
*G06F 1/16* (2006.01)
*G02F 1/1333* (2006.01)
*G02F 1/1345* (2006.01)

(52) U.S. Cl.
CPC .......... *G06F 1/1601* (2013.01); *G02F 1/1345* (2013.01); *G02F 1/133308* (2013.01); *G06F 1/1637* (2013.01); *G02F 2001/133311* (2013.01); *G06F 2200/1612* (2013.01)

(58) Field of Classification Search
USPC ....................................... 361/749, 748, 750
See application file for complete search history.

(56) References Cited

U.S. PATENT DOCUMENTS

| 2008/0246744 | A1 | 10/2008 | Park et al. | |
| 2012/0105340 | A1 | 5/2012 | Beom et al. | |
| 2013/0314881 | A1* | 11/2013 | Cho | H05K 7/02 361/749 |
| 2014/0103315 | A1* | 4/2014 | Jung | H01L 27/3276 257/40 |
| 2014/0334081 | A1* | 11/2014 | Pierce | G06F 1/1658 361/679.3 |

FOREIGN PATENT DOCUMENTS

| KR | 10-2008-0091609 | 10/2008 |
| KR | 10-2012-0044501 | 5/2012 |
| KR | 10-2013-0062114 | 6/2013 |
| KR | 10-2013-0078143 | 7/2013 |
| KR | 10-2013-0101944 | 9/2013 |
| KR | 10-2013-0131010 | 12/2013 |

* cited by examiner

*Primary Examiner* — Andargie M Aychillhum
(74) *Attorney, Agent, or Firm* — H.C. Park & Associates, PLC

(57) ABSTRACT

A display apparatus including: a display panel including a substrate and an encapsulating member and realizing an image; a circuit member arranged to overlap at least a portion of the substrate of the display panel; and a shield member arranged between a surface portion of the substrate of the display panel and the circuit member, the surface portion overlapping the circuit member.

20 Claims, 7 Drawing Sheets

DISPLAY APPARATUS

CROSS REFERENCE TO RELATED APPLICATION

This application claims priority from and the benefit of Korean Patent Application No. 10-2014-0083895, filed on Jul. 4, 2014, which is hereby incorporated by reference for all purposes as if fully set forth herein.

BACKGROUND

Field

Exemplary embodiments relate to a display apparatus.

Discussion of the Background

Recently, display apparatuses have been used in diverse fields. Particularly, display apparatuses have been made thin and light, and thus, display apparatuses have been applied to an increasing number of uses.

The display apparatuses include display devices for providing an image to a user.

The display apparatuses may include a circuit portion to supply electrical signals to the display devices. Here, for the connection of the circuit portion and the display devices, various circuit members, such as a flexible printed circuit board, may be used.

When such kinds of circuit members are used, the display apparatuses may not be easily manufactured, since it is not easy to arrange the circuit members due to adhesive materials and protective materials used to manufacture the display apparatuses, and defects of the display apparatuses may occur.

The above information disclosed in this Background section is only for enhancement of understanding of the background of the inventive concept, and, therefore, it may contain information that does not constitute prior art.

SUMMARY

Exemplary embodiments provide a display apparatus which has improvement in terms of durability and manufacturing characteristics.

Additional aspects will be set forth in part in the description which follows and, in part, will be apparent from the description, or may be learned by practice of the presented embodiments.

According to one or more embodiments of the present invention, a display apparatus includes a display panel including a substrate and an encapsulating member and realizing an image; a circuit member arranged to overlap at least a portion of the substrate of the display panel; and a shield member arranged between a surface portion of the substrate of the display panel and the circuit member, the surface portion overlapping the circuit member.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
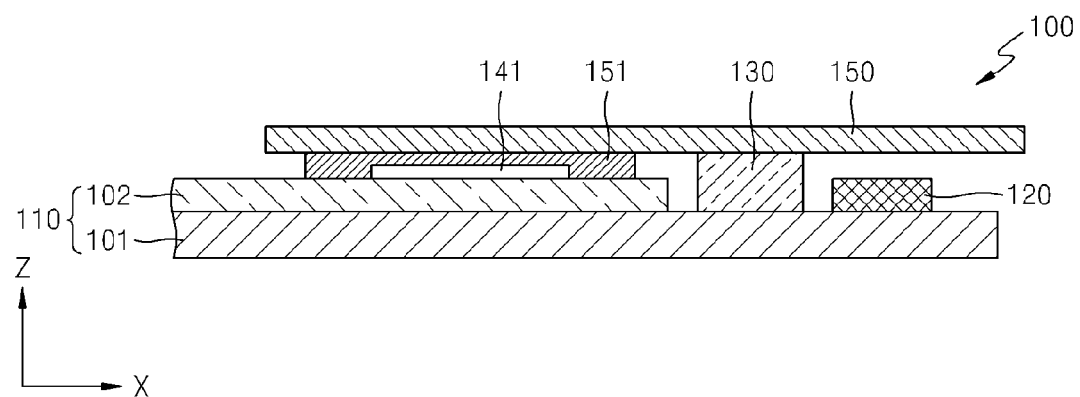
FIG. 1 is a cross-sectional view of a display apparatus according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a cross-sectional view of a display apparatus 100 according to an exemplary embodiment of the present invention. Referring to FIG. 1, the display apparatus 100 includes a display panel 110, a circuit member 150, and a shield member 130. The display panel 110 may include at least one display device for providing an image to a user. The display panel 110 may include various display devices.

The display panel 110 mainly includes a substrate 101 and an encapsulating member 102. The substrate 101 may be formed by using various materials. For example, the substrate 101 may be formed of a glass material mainly including $SiO_2$. Also, the substrate 101 may be formed of a flexible material, for example, a plastic material.

The encapsulating member 102 is arranged to face the substrate 101. The encapsulating member 102 may be formed of the same material as the substrate 101, for example, the glass material mainly including $SiO_2$. Also, the encapsulating member 102 may be formed of a flexible material, for example, a plastic material.

In some embodiments, the encapsulating member 102 may include a thin layer or a thin film. For example, the encapsulating member 102 may include at least one organic layer or at least one inorganic layer. In other embodiments, the encapsulating member 102 may include a structure in which at least one organic layer and at least one inorganic layer are alternately stacked at least once.

The display device (not shown) may be arranged between the substrate 101 and the encapsulating member 102. The display device may have various forms. The display device may be, for example, an organic light-emitting device or a liquid crystal device. However, according to the present embodiment, various kinds of display devices which may realize visible rays on the user side may be used.

In addition, although not shown, in some embodiments, a sealing member (not shown) may be disposed to adhere the substrate 101 and the encapsulating member 102. The sealing member may be disposed around the display device, which is arranged between the substrate 101 and the encapsulating member 102, to adhere the substrate 101 and the encapsulating member 102.

In some embodiments, the encapsulating member 102 may not cover a portion of a surface of the substrate 101. That is, an uncovered portion of the substrate 101 may be exposed through the encapsulating member 102. For example, the encapsulating member 102 may be smaller than the substrate 101. In some embodiments, the encapsulating member 102 may be formed to have a smaller area than the substrate 101.

The circuit member 150 is arranged to overlap a portion of the display panel 110. In detail, at least one surface of the circuit member 150, for example, a bottom surface thereof, and at least one surface of the display panel 110, for example, an upper surface thereof, may face each other. In some embodiments, the circuit member 150 may overlap a portion of an upper surface of the encapsulating member 102 of the display panel 110 and a portion of an upper surface of the substrate 101 of the display panel 110.

The circuit member 150 may transfer electrical signals to the display panel 110. According to a detailed embodiment, the circuit member 150 may receive electrical signals from a circuit portion (not shown) arranged outside the display panel 110 and transfer the electrical signals to the display panel 110.

To this end, an end of the circuit member 150 may be electrically connected with the display panel 110. For example, the circuit member 150 may be electrically connected with a pad portion 141 formed on the upper surface of the encapsulating member 102. In some embodiments, the circuit member 150 and the pad portion 141 may be connected via a conductive connecting member 151. Here, the conductive connecting member 151 may be, for example, a conductive adhesive layer. Another example of the conductive connecting member 151 may be an anisotropic conductive film (ACF).

The circuit member 150 may be of various forms and kinds In some embodiments, the circuit member 150 may include a material having flexibility. For example, the circuit member 150 may be a flexible printed circuit (FPC). Another example of the circuit member 150 may be a flexible printed circuit board (FPCB). The circuit member 150 may transfer electrical signals to the display panel 110.

In some embodiments, the display panel 110 may include a touch pattern (not shown) realizing a touch sensing operation. The circuit member 150 may transfer electrical signals to the touch pattern. In addition, a touch panel (not shown) may be included adjacent to the display panel 110. The circuit member 150 may transfer electrical signals to the touch panel.

The shield member 130 is arranged on a surface portion of the substrate 101 of the display panel 110, the surface portion facing the circuit member 150. The shield member 130 is arranged between the substrate 101 and the circuit member 150.

In some embodiments, the shield member 130 is arranged on the upper surface of the substrate 101 and on a portion of a surface of the substrate 101, the surface not being covered by the encapsulating member 102 and being exposed. The shield member 130 may be spaced apart from a side surface of the encapsulating member 102. However, in some embodiments, the shield member 130 may contact the side surface of the encapsulating member 102.

A side of the shield member 130 contacts the substrate 101 and the other side of the shield member 130 contacts the circuit member 150. That is, the shield member 130 is disposed between the substrate 101 and the circuit member 150 to contact the substrate 101 and the circuit member 150.

The shield member 130 may be disposed around the conductive connecting member 151. That is, the shield member 130 may be disposed farther apart from the center of the display apparatus 100 than the conductive connecting member 151. In some embodiments, the shield member 130 may contact a side of the conductive connecting member 151.

In some embodiments, an integrated circuit (IC) 120 may be disposed on a surface of the substrate 101. The IC 120 may transfer electrical signals, which are, for example, for driving the display panel 110 of the display apparatus 100, to the display panel 110.

The shield member 130 is disposed between the IC 120 and the side surface of the encapsulating member 102. A side of the shield member 130 may contact the substrate 101, and the other side of the shield member 130 may contact the circuit member 150. In some embodiments, the shield member 130 may contact the IC 120.

The shield member 130 may be formed by using various materials. In some embodiments, the shield member 130 may adhere the substrate 101 and the circuit member 150 to each other. For example, the shield member 130 may contain an adhesive material.

In some embodiments, the shield member 130 may have a form of a double-sided tape. That is, an adhesive material may be formed on surfaces of the shield member 130 that contact the substrate 101 and the circuit member 150.

In the display apparatus 100, the shield member 130 is disposed between the circuit member 150 and the substrate 101 of the display panel 110. The shield member 130 may prevent impurities from penetrating between the circuit member 150 and the substrate 101. The impurities attenuate adhesion between the circuit member 150 and the substrate 101 and also attenuate an electrical connection between the circuit member 150 and the display panel 110. For example, as the impurities penetrating between the substrate 101 and the circuit member 150 increase, the gap between the circuit member 150 and the substrate 101 increases, so that the connection between the circuit member 150 and the encapsulating member 102 via, for example, the conductive connecting member 151, may be broken.

However, according to the present exemplary embodiments, the shield member 130 may prevent impurities from penetrating between the circuit member 150 and the substrate 101, and thus, the circuit member 150 and the display panel 110 may be stably connected.

In some embodiments, when a member (not shown), which may be additionally arranged on an upper surface of the display apparatus 100, is formed in a sequential process with respect to the display apparatus 100, it is possible to prevent residual materials from penetrating between the substrate 101 and the circuit member 150. In some embodiments, the shield member 130 may be formed to contact a surface of the circuit member 150 and a surface of the substrate 101, in order to increase impurity prevention effects by the shield member 130.

In some embodiments, the shield member 130 may be formed as the double-sided tape, such that opposing sides of the shield member 130 adhere to the circuit member 150 and the substrate 101, respectively. By doing so, the impurity prevention effects of the shield member 130 may be improved, and the shield member 130 may be effectively fixed to the display panel 110, so that the display panel 110 and the circuit member 150 may be stably connected.

Figure 2:
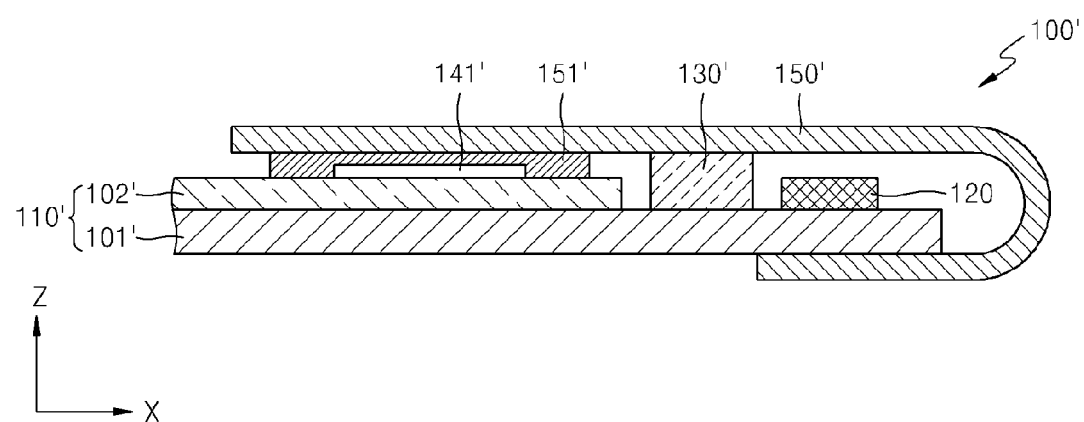
FIG. 2 is a cross-sectional view of a modified embodiment of FIG. 1.

FIG. 2 is a cross-sectional view of a modified embodiment of FIG. 1. Referring to FIG. 2, a display apparatus 100' includes a display panel 110', a circuit member 150', and a shield member 130'.

The circuit member 150' of the display apparatus 100' may be formed to be flexible to be bent in a direction. That is, the circuit member 150' may be formed such that an end thereof faces a surface of a substrate 101' of the display panel 110'. That is, the circuit member 150' may be formed such that an end thereof faces a surface of the substrate 101' of the display panel 110', the surface being opposite to a surface of the substrate 101', which faces an encapsulating member 102'.

In the display apparatus 100' according to the present embodiment, the shield member 130' may prevent impurities from penetrating between the circuit member 150' and the substrate 101', so that the circuit member 150' and the display panel 110' may be stably connected. Also, the circuit member 150' is disposed to be bent such that an end of the circuit member 150' faces a bottom surface of the substrate 101'. Here, the shield member 130' may easily decrease deviation of the circuit member 150'.

In some embodiments, when a member (not shown), which may be additionally arranged on an upper surface of the display apparatus 100', is formed in a sequential process with respect to the display apparatus 100', it is possible to prevent residual materials from penetrating between the substrate 101' and the circuit member 150', and thus, the bent condition of the circuit member 150' may be continually maintained.

Other components of the display apparatus 100', except the circuit member 150', are the same as in the above-described embodiment, and thus, their detailed descriptions will be omitted.

Figure 3:
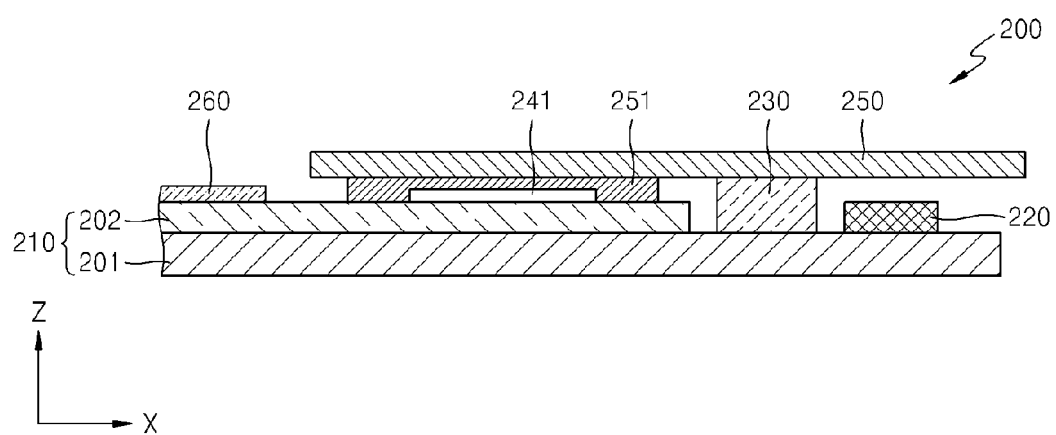
FIG. 3 is a cross-sectional view of a display apparatus according to an exemplary embodiment of the present invention.

FIG. 3 is a cross-sectional view of a display apparatus 200 according to another embodiment of the present invention. Referring to FIG. 3, the display apparatus 200 includes a display panel 210, a circuit member 250, a touch pattern 260, and a shield member 230. For convenience of explanation, descriptions will be made by focusing on different aspects from the above-described embodiments.

The display panel 210 may include at least one display device for providing an image to a user. The display panel 210 mainly includes a substrate 201 and an encapsulating member 202. The encapsulating member 202 is disposed to face the substrate 201.

The circuit member 250 is disposed to overlap a portion of the display panel 210. In detail, at least one surface of the circuit member 250, for example, a bottom surface of the circuit member 250, and at least one surface of the display panel 210, for example, an upper surface of the display panel 210 may face each other. In some embodiments, the circuit member 250 may overlap a portion of an upper surface of the encapsulating member 202 of the display panel 210 and a portion of an upper surface of the substrate 201 of the display panel 210.

The touch pattern 260 is formed on the upper surface of the encapsulating member 202. The touch pattern 260 may be formed on a surface of the encapsulating member 202, the surface being opposite to a surface of the encapsulating member 202 that faces the substrate 201. Although not shown, in some embodiments, the touch pattern 260 may be formed on a bottom surface of the encapsulating member 202.

Also, in other embodiments, the touch pattern 260 may be formed on a surface of the substrate 201 and between the substrate 201 and the encapsulating member 202. Also, although not shown, an additional panel including the touch pattern 260 may be arranged adjacent to the display panel 210.

The circuit member 250 may transfer electrical signals to the touch pattern 260. According to a detailed exemplary embodiment, the circuit member 250 may receive electrical signals from a circuit portion (not shown) arranged outside the display panel 210 and transfer the electrical signals to the touch pattern 260. In other words, although not shown, the circuit member 250 may be electrically connected with the touch pattern 260 via a wiring (not shown) or a conductive pattern (not shown).

For example, the circuit member 250 may be electrically connected with a pad portion 241 of the touch pattern 260 formed on the upper surface of the encapsulating member 202. In some embodiments, the circuit member 250 and the pad portion 241 for the touch pattern 260 may be connected via a conductive connecting member 251. For example, the conductive connecting member 251 may be a conductive adhesive layer. Another example of the conductive connecting member 251 may be an ACF.

The pad portion 241 may be electrically connected with the touch pattern 260 via a wiring (not shown) or a conductive pattern (not shown). The circuit member 250 may be of various forms and kinds In some embodiments, the circuit member 250 may include a flexible material. For example, the circuit member 250 may be an FPC. Another example of the circuit member 250 may be an FPCB.

The shield member 230 is arranged on a surface portion of the substrate 201 that faces the circuit member 250. The shield member 230 is arranged between the substrate 201 and the circuit member 250.

In some embodiments, the shield member 230 is arranged on a portion of an upper surface of the substrate 201, such that a portion of the substrate is not covered by the encapsulating member 202. The shield member 230 may be spaced apart from a side surface of the encapsulating member 202. However, in some embodiments, the shield member 230 may contact the side surface of the encapsulating member 202.

A side of the shield member 230 contacts the substrate 201 and an opposing side of the shield member 230 contacts the circuit member 250. That is, the shield member 230 is disposed between the substrate 201 and the circuit member 250 and contacts the substrate 201 and the circuit member 250.

The shield member 230 may be disposed around the conductive connecting member 251. That is, the shield member 230 may be disposed farther apart from the center of the display apparatus 200 than the conductive connecting member 251. In some embodiments, the shield member 230 may contact one or more sides of the conductive connecting member 251.

In some embodiments, an IC 220 may be disposed on a surface of the substrate 201. The IC 220 may transfer electrical signals to the display panel 210, for example, for driving the display panel 210 of the display apparatus 200.

Here, the shield member 230 is disposed between the IC 220 and the side surface of the encapsulating member 202. A side of the shield member 230 may contact the substrate 201 and an opposing side of the shield member 230 may contact the circuit member 250. In some embodiments, the shield member 230 may contact the IC 220.

The shield member 230 may be formed by using various materials. In some embodiments, the shield member 230 may adhere the substrate 201 and the circuit member 250 to each other. For example, the shield member 230 may contain an adhesive material.

In some embodiments, the shield member 230 may have a form of a double-sided tape. That is, adhesive material is formed on opposing surfaces of the shield member 230, the surfaces contacting the substrate 201 and the circuit member 250, respectively.

In the display apparatus 200, the shield member 230 is disposed between the circuit member 250 and the substrate 201. The shield member 230 may prevent impurities from penetrating between the circuit member 250 and the substrate 201. The impurities attenuate adhesion between the circuit member 250 and the substrate 201 and also attenuate electrical connection between the circuit member 250 and touch pattern 260. For example, as the impurities penetrating between the substrate 201 and the circuit member 250 increase, the gap between the circuit member 250 and the substrate 201 increases, so that the connection between the circuit member 250 and the encapsulating member 202 via, for example, the conductive connecting member 251, may be broken.

However, according to the present embodiment, the shield member 230 may prevent impurities from penetrating between the circuit member 250 and the substrate 201, and thus, the circuit member 250 and the display panel 210 may be stably connected.

In some embodiments, when a member (not shown), which may be additionally arranged on an upper surface of the display apparatus 200, is formed in a sequential process with respect to the display apparatus 200, it is possible to prevent residual materials from penetrating between the substrate 201 and the circuit member 250. In some embodiments, the shield member 230 may be formed to contact a surface of the circuit member 250 and a surface of the substrate 201, in order to increase impurity prevention effects by the shield member 230.

In some embodiments, the shield member 230 may be formed as the double-sided tape such that a side of the shield member 230 and an opposing side of the shield member 230 adhere to the circuit member 250 and the substrate 201, respectively. By doing so, the impurity prevention effects by the shield member 230 may be improved, and the shield member 230 may be effectively fixed to the display panel 210, so that the display panel 210 and the circuit member 250 may be stably connected.

Although not shown, in some embodiments, the bent circuit member 150' of FIG. 2 may be applied to the display apparatus 200 of FIG. 3.

Figure 4:
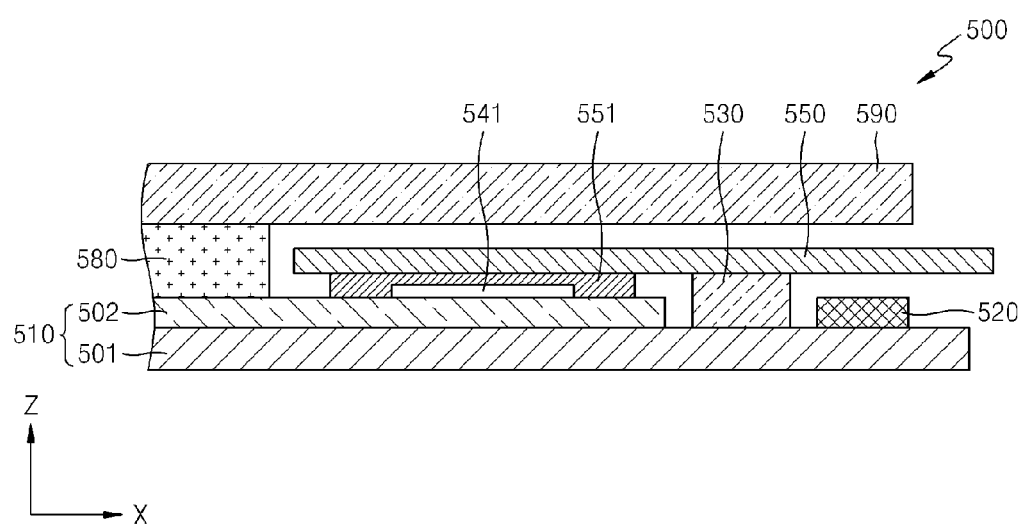
FIG. 4 is a cross-sectional view of a display apparatus according to an exemplary embodiment of the present invention.

FIG. 4 is a cross-sectional view of a display apparatus 500 according to another exemplary embodiment of the present invention. Referring to FIG. 4, the display apparatus 500 includes a display panel 510, a circuit member 550, a shield member 530, an adhesive layer 580, and a cover member 590. For convenience of explanation, description will be made by focusing on different aspects from the above-described embodiments.

The display panel 510 may include at least one display device for realizing an image. The display panel 510 mainly includes a substrate 501 and an encapsulating member 502. The encapsulating member 502 is disposed to face the substrate 501.

The circuit member 550 is disposed to overlap a portion of the display panel 510. In detail, at least one surface of the circuit member 550, for example, a bottom surface of the circuit member 550, and at least one surface of the display panel 510, for example, an upper surface of the display panel 510 may face each other.

In some embodiments, the circuit member 550 may overlap a portion of an upper surface of the encapsulating member 502 of the display panel 510 and a portion of an upper surface of the substrate 501 of the display panel 501. Although not shown, in some embodiments, a touch pattern (not shown) may be formed on an upper surface or a bottom surface of the encapsulating member 502, as illustrated in FIG. 3.

The circuit member 550 may transfer electrical signals to the display panel 510. In some embodiments, the circuit member 550 may transfer electrical signals to the touch pattern.

The circuit member 550 may be electrically connected with a pad portion 541 formed on the upper surface of the encapsulating member 502. In some embodiments, the circuit member 550 and the pad portion 541 for the touch pattern may be connected via a conductive connecting member 551. For example, the conductive connecting member 551 may be a conductive adhesive layer. Another example of the conductive connecting member 551 may be an ACF.

The circuit member 550 may be of various forms and kinds In some embodiments, the circuit member 550 may include a flexible material. For example, the circuit member 550 may be an FPC. Another example of the circuit member 550 may be an FPCB.

The shield member 530 is arranged on a surface portion of the substrate 501 of the display panel 510 overlapping the circuit member 550. The shield member 530 is arranged between the substrate 501 and the circuit member 550.

In some embodiments, the shield member 530 is arranged on the upper surface of the substrate 501, the surface not being covered by the encapsulating member 502 and being exposed. The shield member 530 may be spaced apart from a side surface of the encapsulating member 502. However, in some embodiments, the shield member 530 may contact the side surface of the encapsulating member 502.

A side of the shield member 530 contacts the substrate 501 and the other side of the shield member 530 contacts the circuit member 550. That is, the shield member 530 is disposed between the substrate 501 and the circuit member 550, to contact the substrate 501 and the circuit member 550.

The shield member 530 may be disposed around the conductive connecting member 551. That is, the shield member 530 may be disposed farther apart from the center of the display apparatus 500 than the conductive connecting member 551. In some embodiments, the shield member 530 may contact a side of the conductive connecting member 551.

In some embodiments, an IC 520 may be disposed on a surface of the substrate 501. The IC 520 may transfer electrical signals, which are, for example, for driving the display panel 510 of the display apparatus 500, to the display panel 510.

The shield member 530 is disposed between the IC 520 and the side surface of the encapsulating member 502. A side of the shield member 530 may contact the substrate 501, and the other side of the shield member 530 may contact the circuit member 550.

In some embodiments, the shield member 530 may contact the IC 520. The shield member 530 may be formed by using various materials. In some embodiments, the shield member 530 may adhere the substrate 501 and the circuit member 550 to each other. For example, the shield member 530 may contain an adhesive material.

In some embodiments, the shield member 530 may have a form of a double-sided tape. That is, an adhesive material may be formed on opposing surfaces of the shield member 530, the surfaces contacting the substrate 501 and the circuit member 550, respectively.

The cover member 590 is arranged above the display panel 510. The adhesive layer 580 may be formed between the cover member 590 and the display panel 510. The cover member 590 may protect the display panel 510. The cover member 590 may be formed of various materials. For example, the cover member 590 may be formed of a glass material or a plastic material. In some embodiments, in the case in which the light realized by the display panel 510 is transmitted through the cover member 590, the cover member 590 may be formed of a light transmittance material.

The adhesive layer 580 is formed to adhere the cover member 590 and the display panel 510 to each other. For example, the adhesive layer 580 may include various adhesive materials. In some embodiments, the adhesive layer 580 may include an organic material, for example, a resin.

In some embodiments, the adhesive layer 580 may be formed by forming a resin material, which is liquefied or has fluidity, between the cover member 590 and the display panel 510. The cover member 590 is arranged above the circuit member 550. By doing so, a portion of the circuit member 550, which overlaps the display panel 510, is between the cover member 590 and the display panel 510.

In the display apparatus 500 according to the present embodiment, the shield member 530 is disposed between the circuit member 550 and the substrate 501. The shield member 530 may prevent impurities from penetrating between the circuit member 550 and the substrate 501. The impurities attenuate adhesion between the circuit member 550 and the substrate 501 and also attenuate electrical connection between the circuit member 550 and the touch pattern 560. For example, as the impurities penetrating between the substrate 501 and the circuit member 550 increase, the gap between the circuit member 550 and the substrate 501 increases, so that the connection between the circuit member 550 and the encapsulating member 502 via, for example, the conductive connecting member 551, may be broken.

However, according to the present embodiment, the shield member 530 may prevent impurities from penetrating between the circuit member 550 and the substrate 501, and thus, the circuit member 550 and the display panel 510 may be stably connected.

In addition, when the adhesive layer 580 is formed by using a material having fluidity, for example, a resin, the shield member 530 may reduce or prevent overflowing of the resin and penetrating of the resin between the substrate 501 and the circuit member 550. In particular, a lifting defect of the circuit member 550 or an external contamination of the display apparatus 500, which may occur because the fluid resin forming the adhesive layer 580 flows in an uncured condition and penetrates between the substrate 501 and the circuit member 550, may be easily prevented.

In some embodiments, the shield member 530 may be formed to contact a surface of the circuit member 550 and a surface of the substrate 501, in order to increase impurity prevention effects of the shield member 530.

In some embodiments, the shield member 530 may be formed as the double-sided tape such that opposing sides of the shield member 530 adhere to the circuit member 550 and the substrate 501, respectively. By doing so, the impurity prevention effects provided by the shield member 530 may be improved, and the shield member 530 may be effectively fixed to the display panel 510 so that the display panel 510 and the circuit member 550 may be stably connected.

Although not shown, in some embodiments, the bent circuit member 150' of FIG. 2 may be applied to the display apparatus 500. Also, in other embodiments, the touch pattern 260 of FIG. 3 may be applied to the display apparatus 500.

Figure 5:
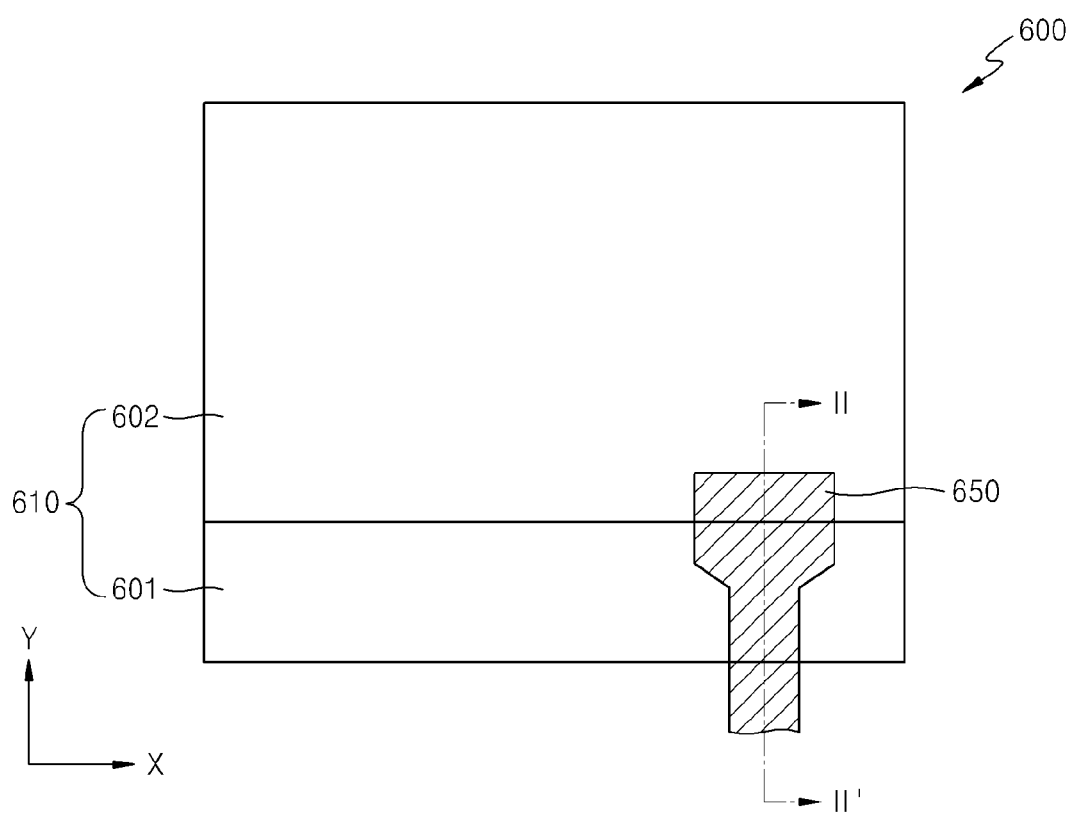
FIG. 5 is a plan view of a display apparatus according to an exemplary embodiment of the present invention.
Figure 6:
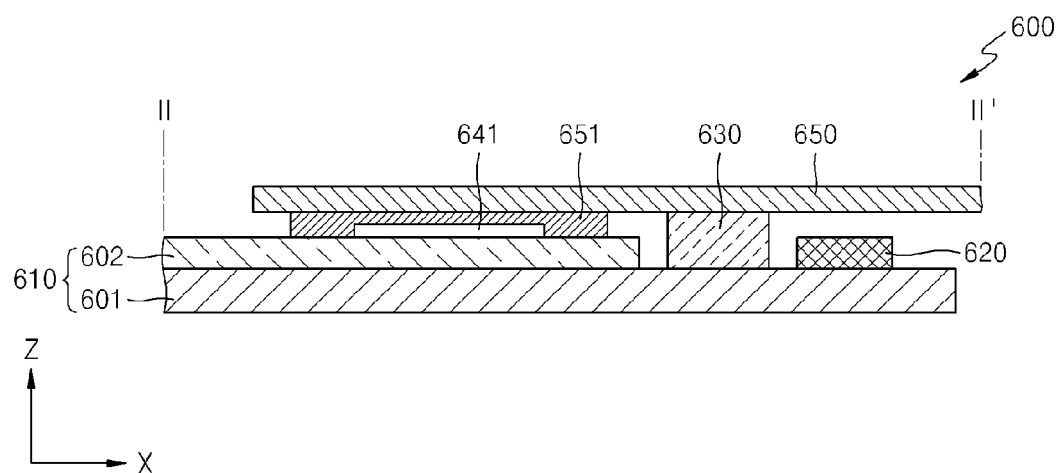
FIG. 6 is a cross-sectional view taken along a line II-II' of FIG. 5.

FIG. 5 is a plan view of a display apparatus 600 according to another exemplary embodiment of the present invention. FIG. 6 is a cross-sectional view taken along a line II-II' of FIG. 5. Referring to FIGS. 5 and 6, the display apparatus 600 includes a display panel 610, a circuit member 650, and a shield member 630.

The display panel 610 may include at least one display device for realizing an image. The display panel 610 may include various display devices. The display panel 610 mainly includes a substrate 601 and an encapsulating member 602. The encapsulating member 602 is arranged to face the substrate 601. Materials of the substrate 601 and the encapsulating member 602 are the same as in the above-described embodiments, and thus, their detailed description will be omitted.

A display device (not shown) may be disposed between the substrate 601 and the encapsulating member 602. The display device may have various forms. The display device may be, for example, an organic light-emitting device or a liquid crystal device. However, according to the present embodiment, various kinds of display devices which may realize visible rays on the user side may be used.

In some embodiments, the encapsulating member 602 may not cover a portion of a surface of the substrate 601. In some embodiments, the encapsulating member 602 may be formed to have a smaller area than the substrate 601.

The circuit member 650 is arranged to overlap a portion of the display panel 610. In detail, at least one surface of the circuit member 650, for example, a bottom surface thereof, and at least one surface of the display panel 610, for example, an upper surface thereof, may face each other.

The circuit member 650 may have a smaller width than the display panel 610. That is, the circuit member 650 may have a width in a direction, for example, in a direction of the X-axis of FIG. 5. The width of the circuit member 650 may be smaller than a width of the display panel 610 in the direction of the X-axis.

An end of the circuit member 650 may correspond to an upper surface of the encapsulating member 602 of the display panel 610 and the other end of the circuit member 650 may be deviated from the display panel 610. In some embodiments, the circuit member 650 may overlap a portion of the upper surface of the encapsulating member 602 of the display panel 610 and a portion of an upper surface of the substrate 601 of the display panel 610.

The circuit member 650 may transfer electrical signals to the display panel 610. According to a detailed embodiment, the circuit member 650 may receive electrical signals from a circuit portion (not shown) arranged outside the display panel 610 and transfer the electrical signals to the display panel 610.

To this end, an end of the circuit member 650 may be electrically connected with the display panel 610. For example, the circuit member 650 may be electrically connected with a pad portion 641 formed on the upper surface of the encapsulating member 602. In some embodiments, the circuit member 650 and the pad portion 641 may be connected via a conductive connecting member 651. Here, the conductive connecting member 651 may be, for example, a conductive adhesive layer. Another example of the conductive connecting member 651 may be an ACF.

The circuit member 650 may be of various forms and kinds In some embodiments, the circuit member 650 may include a flexible material. For example, the circuit member 650 may be an FPC. Another example of the circuit member 650 may be an FPCB.

In some embodiments, the display apparatus 600 may include a touch pattern (not shown), which is the same as the touch pattern 260 realizing the touch sensing function as illustrated in FIG. 3. The circuit member 650 may transfer electrical signals to the touch pattern.

The shield member 630 is arranged on a surface portion of the substrate 601 of the display panel 610, the surface portion overlapping the circuit member 650. The shield member 630 is arranged between the substrate 601 and the circuit member 650. In some embodiments, the shield member 630 may be formed not to be deviated from the circuit member 650.

In some embodiments, the shield member 130 is arranged on the upper surface of the substrate 601 and on a portion of a surface of the substrate 601, the surface not being covered by the encapsulating member 602 and being exposed. The shield member 630 may be spaced apart from a side surface of the encapsulating member 602. However, in some embodiments, the shield member 630 may contact the side surface of the encapsulating member 602.

A side of the shield member 630 contacts the substrate 601 and the other side of the shield member 630 contacts the circuit member 650. That is, the shield member 630 is disposed between the substrate 601 and the circuit member 650 to contact the substrate 601 and the circuit member 650.

The shield member 630 may be disposed around the conductive connecting member 651. That is, the shield member 630 may be disposed farther apart from the center of the display apparatus 600 than the conductive connecting member 651. In some embodiments, the shield member 630 may contact a side of the conductive connecting member 651.

In some embodiments, an IC 620 may be disposed on a surface of the substrate 601. The IC 620 may transfer electrical signals, which are, for example, necessary for driving the display panel 610 of the display apparatus 600, to the display panel 610. The IC 620 may be disposed not to be deviated from the circuit member 650.

Here, the shield member 630 is disposed between the IC 620 and the side surface of the encapsulating member 602. A side of the shield member 630 may contact the substrate 601 and an opposing side of the shield member 630 may contact the circuit member 650.

In some embodiments, the shield member 630 may contact the IC 620. The shield member 630 may be formed by using various materials. In some embodiments, the shield member 630 may make the substrate 601 and the circuit member 650 adhere to each other. For example, the shield member 630 may contain an adhesive material.

In some embodiments, the shield member 630 may have a form of a double-sided tape. That is, the shield member 630 may have the form of the double-sided tape, such that the adhesive material is formed on both surfaces of the shield member 630, the surfaces contacting the substrate 601 and the circuit member 650, respectively.

In the display apparatus 600 according to the present embodiment, the shield member 630 is disposed between the circuit member 650 and the substrate 601 of the display panel 610. The shield member 630 may prevent impurities from penetrating between the circuit member 650 and the substrate 601. The impurities attenuate adhesion between the circuit member 650 and the substrate 601 and also attenuate electrical connection between the circuit member 650 and the display panel 610. For example, as the impurities penetrating between the substrate 601 and the circuit member 650 increase, the gap between the circuit member 650 and the substrate 601 increases, so that the connection between the circuit member 650 and the encapsulating member 602 via, for example, the conductive connecting member 651, may be at last broken.

However, according to the present embodiment, the shield member 630 may prevent impurities from penetrating between the circuit member 650 and the substrate 601, and thus, the circuit member 650 and the display panel 610 may be stably connected.

In some embodiments, when a member (not shown), which may be additionally arranged on an upper surface of the display apparatus 600, is formed in a sequential process with respect to the display apparatus 600, it is possible to prevent residual materials from penetrating between the substrate 601 and the circuit member 150.

In some embodiments, the shield member 630 may be formed to contact a surface of the circuit member 650 and a surface of the substrate 601, in order to increase impurity prevention effects provided by the shield member 630.

In some embodiments, the shield member 630 may be formed as the double-sided tape such that a side of the shield member 630 and an opposing side of the shield member 630, adhere to the circuit member 650 and the substrate 601, respectively. By doing so, the impurity prevention effects provided by the shield member 630 may be improved, and the shield member 630 may be effectively fixed to the display panel 610, so that the display panel 610 and the circuit member 650 may be stably connected.

Although not shown, in some embodiments, the bent circuit member 150' may be applied to the display apparatus 600. Also, in other embodiments, the touch pattern 260 of FIG. 3 may be applied to the display apparatus 600. Also, in other embodiments, the cover member 590 and the adhesive layer 580 of FIG. 4 may be applied to the display apparatus 600.

Figure 7:
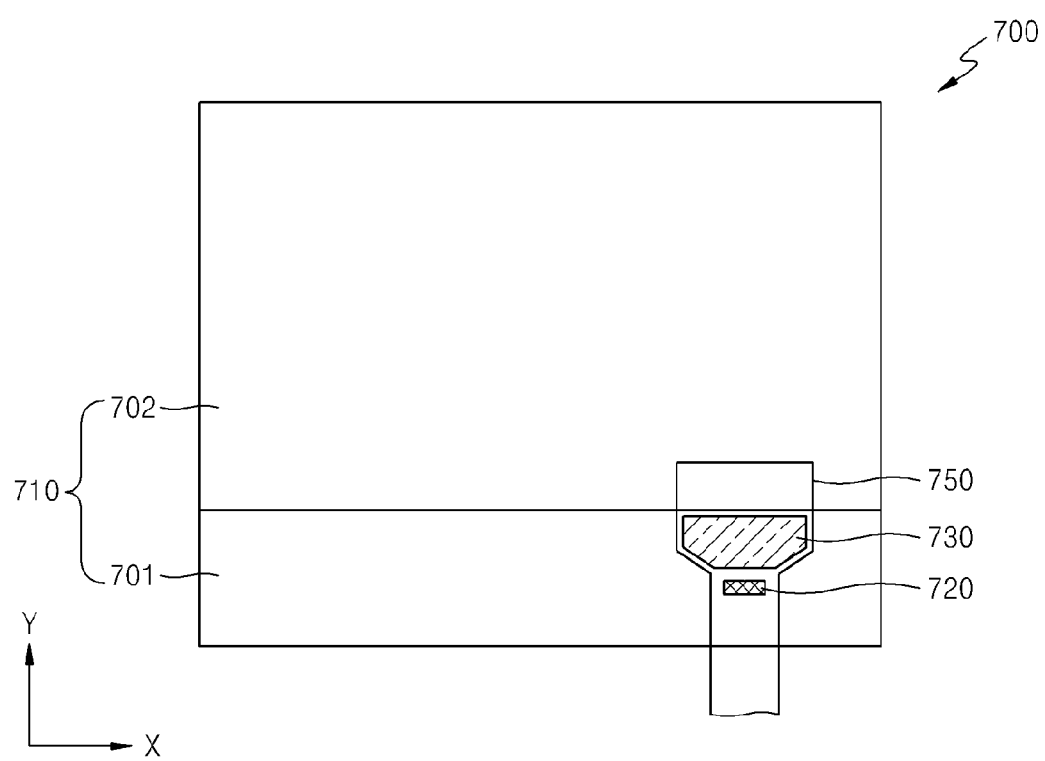
FIG. 7 is a plan view of a display apparatus according to an exemplary embodiment of the present invention.

FIG. 7 is a plan view of a display apparatus 700 according to another embodiment of the present invention. Referring to FIG. 7, the display apparatus 700 includes a display panel 710, a circuit member 750, and a shield member 730.

The display panel 710 may include at least one display device for realizing an image. The display panel 710 may include various display devices. The display panel 710 mainly includes a substrate 701 and an encapsulating member 702. The encapsulating member 702 is arranged to face the substrate 701. Materials of the substrate 701 and the encapsulating member 702 are the same as in the above-described embodiments, and thus, their detailed description will be omitted.

A display device (not shown) may be disposed between the substrate 701 and the encapsulating member 702. The display device may have various forms. The display device may be, for example, an organic light-emitting device or a liquid crystal device. However, according to the present exemplary embodiment, various kinds of display devices which may realize visible rays on the user side may be used.

In some embodiments, the encapsulating member 702 may not cover a portion of a surface of the substrate 701. In some embodiments, the encapsulating member 702 may be formed to have a smaller area than the substrate 701.

The circuit member 750 is arranged to overlap a portion of the display panel 710. In detail, at least one surface of the circuit member 750, for example, a bottom surface thereof, and at least one surface of the display panel 710, for example, an upper surface thereof, may face each other.

The circuit member 750 may have a smaller width than the display panel 710. That is, the circuit member 750 may have a width in a direction, for example, in a direction of the X-axis of FIG. 5. The width of the circuit member 750 may be smaller than a width of the display panel 710 in the direction of the X-axis.

An end of the circuit member 750 may correspond to an upper surface of the encapsulating member 702 of the display panel 710 and an opposing end of the circuit member 750 may be deviated from the display panel 710. In some embodiments, the circuit member 750 may overlap a portion of the upper surface of the encapsulating member 702 of the display panel 710 and a portion of an upper surface of the substrate 701 of the display panel 710.

The circuit member 750 may transfer electrical signals to the display panel 710. According to a detailed embodiment, the circuit member 750 may receive electrical signals from a circuit portion (not shown) arranged outside the display panel 710 and transfer the electrical signals to the display panel 710. Also, in some embodiments, the display apparatus 700 may include a touch pattern (not shown) for realizing a touch sensing operation, and the circuit member 750 may transfer electrical signals to the touch pattern.

The circuit member 750 may be of various forms and kinds In some embodiments, the circuit member 750 may include a material having flexibility. For example, the circuit member 750 may be an FPC. Another example of the circuit member 750 may be an FPCB.

The shield member 730 is arranged on a surface portion of the substrate 701 of the display panel 710, the surface portion overlapping the circuit member 750. The shield member 730 is arranged between the substrate 701 and the circuit member 750. Also, the shield member 730 may be formed to not be deviated from the circuit member 750.

Also, the shield member 730 may have an edge formed in parallel with an edge of the circuit member 750. That is, the edge of the shield member 730 may be formed in parallel with the edge of a portion of the circuit member 750, the portion corresponding to the substrate 701.

In some embodiments, an IC 720 may be disposed on a surface of the substrate 701. The IC 720 may transfer electrical signals, which are, for example, necessary for driving the display panel 710 of the display apparatus 700, to the display panel 710. The IC 720 may be arranged not to be deviated from the circuit member 750.

In some embodiments, the edge of the shield member 730 may overlap at least a portion of the edge of the circuit member 750. The shield member 730 may be formed in parallel with an edge of a portion of the circuit member 750, the portion corresponding to the substrate 701 and being between edges of the IC 720 and the encapsulating member 702.

In some embodiments, the shield member 730 is arranged on the upper surface of the substrate 701 and on a portion of a surface of the substrate 701, the surface not being covered by the encapsulating member 702 and being exposed. The shield member 730 may be spaced apart from a side surface of the encapsulating member 702. However, in some embodiments, the shield member 730 may contact the side surface of the encapsulating member 702.

A side of the shield member 730 contacts the substrate 701 and an opposing side of the shield member 730 contacts the circuit member 750. That is, the shield member 730 is disposed between the substrate 701 and the circuit member 750 to contact the substrate 701 and the circuit member 750. In some embodiments, the shield member 730 may contact side surfaces of the IC 720 and the encapsulating member 702.

The shield member 730 may be formed by using various materials. In some embodiments, the shield member 730 may adhere the substrate 701 and the circuit member 750 to each other. For example, the shield member 730 may contain an adhesive material.

In some embodiments, the shield member 730 may have a form of a double-sided tape. That is, the shield member 730 an adhesive material is formed on opposing surfaces of the shield member 730, the surfaces contacting the substrate 701 and the circuit member 750, respectively.

In the display apparatus 700 according to the present embodiment, the shield member 730 is disposed between the circuit member 750 and the substrate 701 of the display panel 710. The shield member 730 may prevent impurities from penetrating between the circuit member 750 and the substrate 701. The impurities attenuate adhesion between the circuit member 750 and the substrate 701 and also attenuate electrical connection between the circuit member 750 and the display panel 710. For example, as the amount of the impurities penetrating between the substrate 701 and the circuit member 750 increases, the gap between the circuit member 750 and the substrate 701 increases, so that the connection between the circuit member 750 and the encapsulating member 702 via, for example, the conductive connecting member 751, may be broken.

However, according to the present embodiment, the shield member 730 may prevent impurities from penetrating between the circuit member 750 and the substrate 701, and thus, the circuit member 750 and the display panel 710 may be stably connected. Also, the edge of the shield member 730 is formed in parallel with a portion of the edge of the circuit member 750 so that impurities prevent effects may be improved.

In some embodiments, when a member (not shown), which may be additionally arranged on an upper surface of the display apparatus 700, is formed in a sequential process with respect to the display apparatus 700, it is possible to prevent residual materials from penetrating between the substrate 701 and the circuit member 750. In some embodiments, the shield member 730 may be formed to contact a surface of the circuit member 750 and a surface of the substrate 701, in order to increase impurity prevention effects by the shield member 730.

In some embodiments, the shield member 730 may be formed as the double-sided tape such that a side of the shield member 730 and an opposing side of the shield member 730, adhere to the circuit member 750 and the substrate 701, respectively. By doing so, the impurity prevention effects by the shield member 730 may be improved, and the shield member 730 may be effectively fixed to the display panel 710 so that the display panel 710 and the circuit member 750 may be stably connected.

As described above, according to the one or more of the above exemplary embodiments of the present invention, display apparatuses, which have improved encapsulation characteristics, may be easily manufactured.

It should be understood that the exemplary embodiments described herein should be considered in a descriptive sense only and not for purposes of limitation. Descriptions of features or aspects within each embodiment should typically be considered as available for other similar features or aspects in other embodiments.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display apparatus comprising:
 a display panel configured to display an image and comprising a substrate and an encapsulating member;
 a circuit member overlapping at least a portion of the substrate of the display panel; and
 a shield member disposed between the substrate of the display panel and the circuit member in a vertical direction when in a sectional view,
 wherein the circuit member is electrically connected with the display panel.

2. The display apparatus of claim 1, wherein the shield member faces the encapsulating member.

3. The display apparatus of claim 1, wherein:
 the encapsulating member covers a first portion of a surface of the substrate and exposes a second portion of the surface of the substrate; and
 the shield member is disposed on the exposed second portion of the surface of the substrate.

4. The display apparatus of claim 1, wherein the shield member is disposed adjacent to or apart from a side surface of the encapsulating member.

5. The display apparatus of claim 1, wherein a first side of the shield member contacts the substrate and an opposing second side of the shield member contacts the circuit member.

6. The display apparatus of claim 1, wherein the shield member comprises an adhesive material.

7. The display apparatus of claim 1, wherein the shield member comprises double-sided tape adhering the substrate and the circuit member.

8. The display apparatus of claim 1, further comprising an integrated circuit (IC) disposed on the substrate,
 wherein the shield member is disposed between the IC and a side of the encapsulating member.

9. The display apparatus of claim 1, further comprising a pad portion disposed on a surface of the encapsulating member that faces away from the substrate, wherein the circuit member is electrically connected with the pad portion by a conductive connecting member, and wherein the shield member is disposed farther from the center of the display apparatus than the conductive connecting member.

10. The display apparatus of claim 1, further comprising a touch pattern configured to sense a touch, wherein the circuit member is electrically connected with the touch pattern.

11. The display apparatus of claim 10, wherein:

the touch pattern is disposed on a surface of the encapsulating member that faces away from the substrate, and the circuit member overlaps the touch pattern is formed.

12. The display apparatus of claim 1, wherein the circuit member is flexible, and an end of the circuit member is disposed on a surface of the substrate that faces away from the encapsulating member.

13. The display apparatus of claim 1, further comprising a cover member disposed on the display panel, wherein a portion of the circuit member is disposed between the display panel and the cover member.

14. The display apparatus of claim 13, further comprising an adhesive layer disposed between the display panel and the cover member.

15. The display apparatus of claim 14, wherein the adhesive layer comprises an organic material.

16. The display apparatus of claim 14, wherein the adhesive layer comprises a resin.

17. The display apparatus of claim 13, wherein the cover member is transparent.

18. The display apparatus of claim 1, wherein the shield member is formed not to be deviated from the circuit member.

19. The display apparatus of claim 1, wherein an edge of the shield member is parallel with an edge of the circuit member.

20. The display apparatus of claim 1, wherein the display panel comprises a display device to form the image.

* * * * *